United States Patent [19]

Klüver et al.

[11] Patent Number: 5,227,070
[45] Date of Patent: Jul. 13, 1993

[54] TEXTILE REINFORCED MEMBRANE FILTER, METHOD FOR MANUFACTURE AND APPLICATION

[75] Inventors: Horst Klüver, Dransfeld; Dietmar Nussbaumer, Gottingen; Eberhard Wünn, Gottingen/Nikolausberg, all of Fed. Rep. of Germany

[73] Assignee: Sartorius AG, Fed. Rep. of Germany

[21] Appl. No.: 575,272

[22] Filed: Aug. 30, 1990

[30] Foreign Application Priority Data

Aug. 31, 1989 [DE] Fed. Rep. of Germany ....... 3928934

[51] Int. Cl.$^5$ .............................................. B01D 65/08
[52] U.S. Cl. .................... 210/636; 210/490; 210/500.38
[58] Field of Search ................... 210/490, 500.38, 636

[56] References Cited

U.S. PATENT DOCUMENTS 3,276,996  10/1966  Lazare .................... 210/500.38 X
4,579,662   4/1986  Jonsson ........................ 210/636
4,645,602   2/1987  Barnes, Jr. et al. ........ 210/500.38 X

*Primary Examiner*—Frank Spear
*Attorney, Agent, or Firm*—Reed Smith Shaw & McClay

[57] ABSTRACT

The invention relates to a textile reinforced membrane filter wherein the membrane filter material and the textile reinforcing material are made from synthetic polymers of the same substance class. A method for the production of the textile reinforced membrane filters where the first contact time between the filter solution film and the textile reinforcement material is maintained between 0.1 and 15 seconds.

17 Claims, No Drawings

TEXTILE REINFORCED MEMBRANE FILTER, METHOD FOR MANUFACTURE AND APPLICATION

FIELD OF THE INVENTION

The invention relates to textile reinforced membrane filers, particularly those obtained after regenerating baths processes, and, in particular, to membrane filters wherein the textile reinforcement material is of the same class of synthetic polymer as the filter material. The invention also relates to a method for their manufacture as well as application of the filters, particularly as sheeting for possible use in tube filters and winding modules, as well as flat filters, particularly for use in housings or modules for static filtration and for cross current filtration.

BACKGROUND OF THE INVENTION

A variety of polymeric materials is suitable for the manufacture of micro and ultraporous membrane filters having symmetrical or asymmetrical pore structures, particularly with the regenerating bath method.

Depending upon the manufacturing conditions and the respective polymer material, membrane filters are hydrophilic (water wettable without the use of a surface-active agent) or hydrophobic (not wettable). Hydrophilic membrane filters of aliphatic polyamide, such as PA 6.6 and PA 6 (e.g., U.S. Pat. Nos. 3,876,738 and 4,340,479 and German Patent Specification 3028213) are of particular interest since they have high chemical and temperature resistance. It is important that the compounds forming the alipathic polyamides have safe toxicological qualities.

The manufacture of these membranes on a commercial scale is generally done in such a way, that a solution of the material forming the membrane, such as a solution of a polyamide in formic acid, that may contain a certain amount of a non-dissolving agent for the polymers is used. The resulting pourable solution is applied, often on a rotating drum, in the form of an endless film onto a backing, and fed into a regenerating bath, where the dissolved polymer is precipitated to form a membrane filter. The filter thus formed is thereafter removed, washed and dried in a continuous strip.

The regenerating bath may contain a certain amount of the same solvent that is used in the manufacture of the pourable solution. The difference in the manufacture of the pourable solution between the solvent material system and the regenerating bath system is that the regenerating bath contains more non-dissolving agents than the solvent system for the manufacture of the pourable solution to effect the precipitation of the membrane filter.

The membrane filters with an approximate thickness between 60 µm and 200 µm, are generally processed by cutting, rolling, pleating, and the like, for possible use in tube filters. The disadvantage of this processing is the lack of mechanical firmness. It is also known that membrane filters can expand when wetted with common solvents, such as water or alcohol.

Because of this characteristic it is known to reinforce membrane filters with mechanically strong, openmeshed, textile reinforcing material, into which the porous membrane filter matrix is imbedded. Spun yarn or staple fiber, or possibly woven or knitted cloth can be used as textile reinforcing material. Perforated foils (ductile foil) can also be used. Textile reinforcement for membranes of PA 6 and PA 6.6 is exclusively made of polyester, such as polyethylterephthalate, and polyolefins, such as polypropylene. There is literature describing the use of fibers of polyamides and aromatic polyamides (aramides), cellulose, such as paper, and regenerated cellulose, cellulose esters and cellulose ethers, such as glass fiber as reinforcing material for membranes of PA 6 and PA 6.6 (U.S. Pat. No. 4,340,479, EP0173500 and EP0096306). Accordingly, the material used for reinforcing membrane filters is generally a substance other than the material of the membrane filter.

It is generally known that the mechanical firmness of membrane filters can be increased and their expansion limited. However, the essential properties of the textile reinforced membrane filters are impaired. Polyolefin material, such as a polypropylene cloth, imbedded into a hydrophilic membrane filter matrix, reduces the frequently desired high processing temperature.

Textile reinforcing material of polyester is not hydrolytic at high pH levels and/or at high temperatures, so that such membrane filters, possibly of polyamides, cannot be used in alkaline media. Polyester reinforcing material is not resistant to a number of solvents, so that a certain amount of dissolved polyester is consequently filtered with the filtering media. This presents considerable problems in the foods and pharmaceutical industry.

Textile reinforcing material of polyolefins, such as polyethelene or polypropylene, has the disadvantage that it is not very temperature resistant, so that the favorable temperature resistance of the filter is reduced if such textile is imbedded into a polyamide membrane filter.

The object of the invention is to produce textile reinforced membrane filters that do not show any of the above described disadvantages of textile reinforced membrane filters of the prior art.

SUMMARY OF THE INVENTION

The invention is characterized by the finding that textile reinforced membrane filters manufactured of textile reinforcing material (such as cloth) and membrane filters of synthetic polymers of the same substance class show homogeneous physical and homogeneous chemical properties. These advantages are particularly evident when the material used in the manufacture of the membrane filter and the reinforcing material is a chemically identical polymer.

Preferred textile reinforced membrane filters according to the invention are those where the textile reinforcing material is an identical aliphatic polyamide, particularly PA 6.6 and PA 6, to that used to make the membrane filter matrix.

The membrane filters of the prior art always used material, particularly polymer material, for the manufacture of the textile reinforcement for the membrane filters, which had different solubility properties, and, particularly, chemical properties, than the material used in the manufacture of the membrane filters.

As already mentioned, textile reinforced membrane filters with textile reinforcing and a membrane filter matrix of aliphatic polyamides, such as PA 6 and PA 6.6 are preferred for use in the present invention.

The membranes of the present invention, unlike those made of polyester cloth or polyester fiber, have exceptionally high alkaline resistance, further eliminating the problem of particles of polyester reinforcement being dissolved by organic solvents. They also have the advantage that membrane filters reinforced with polyolefins have exceptionally high temperature resistance.

PRESENTLY PREFERRED EMBODIMENTS OF THE INVENTION

The textile reinforcements according to the present invention are preferably woven and knit fabrics which, depending on the thickness and the type of the membranes that they reinforce, are made of threads or yarns of single or multiple thread. If desired, perforated foils can be used as reinforcing material, according to the invention. The woven or knit fabrics or the perforated foils must have mesh openings or perforations so that the filtration properties of the membrane filters and the rate of flow are not essentially influenced.

It is preferable that the reinforcing material be completely imbedded in the membrane filter material and bonded with it. However, in another embodiment, the membrane filters have a free layer of textile reinforcing material on one or possibly both sides of the membrane, that are sufficiently bonded with the membrane filter.

The thread diameter of the reinforcing textile should be between 25 and 80 μm for good bonding with the membrane filter material.

Continuous methods are preferably used for the manufacture of membrane filters according to the invention. In these methods the membrane filter polymers, such as PA 6.6, are dissolved in a solvent or solvent mixture, such as a mixture of formic acid and water in the case of PA 6.6, to provide a pourable solution. This solution is applied, typically on a rotating drum, in the form of an endless film onto backing, and fed into a regenerating bath, where the membrane filter is precipitated from the poured solvent film. The regenerating bath should be of the same solvent and non-solvent material as the poured solution, whereby the quantity of non-solvent material is larger than in the pourable solution.

According to the invention, known methods for the manufacture of membrane filters of the prior art are modified, so that the textile reinforcing material is imbedded in or on the pourable solution film and bonds with the membrane filter during precipitation in the regenerating bath.

Contrary to methods of the prior art for the imbedding of such textile reinforcing material which is clearly different from the membrane filter material in its chemical identity and, therefore, in its solvent property, the imbedding of textile reinforcements in the pourable solution film, according to the present invention, requires certain measures, that are not applicable to the prior art methods.

Since the textile reinforcing material and membrane filter material are of synthetic polymers of the same substance class, preferably chemically identical polymers, and, therefore, soluble in the same solvent or solvent system, the contact of the reinforcing material with the pourable solution film causes a bonding of the reinforcing material and, therefore, a change in the composition of the reinforcing material surrounding the pourable solution, resulting in an altered stabilization (segregation behavior) of the membrane formation.

The surface bonding of the textile reinforcing material is preceded by a continuous expansion, combined with an increase in volume, such as of the threads or yarns in the woven or knit fabric that is being used. The continuous expansion of the textile reinforcing material until it hardens in the regenerating bath results in a shrinking of the textile strip that is being wetted by the pourable solution, particularly if the woven or knit fabric is such that the threads or yarns of the knit or woven fabric expand to the outside while the core remains unchanged, so that the threads or yarns do not stretch in length. That results in a migration of individual surface expanded and possibly already bonded threads or yarns horizontally to the center of the reinforcing material strip, i.e., an axial shrinking, and leads to an increased thread tension in the longitudinal direction of the strip. This leads to a shifting in invertical (radial) direction from the filter in cases where the pourable solution film and the imbedded textile reinforcing material is used in a continuous band or drum filter. This axial or radial shifting component can possibly cause a thread drag from the loosened material. The material forming the membrane forms a microporous matrix in the regenerating bath, while the thread drag hardens to an impermeable film within the filter matrix resulting in a reduced rate of flow through the reinforced membrane filter.

The above described thread drag formation was one of the reasons that membrane filters of the prior art do not use a reinforcing material and membrane filter material that is of the same substance class or chemically identical.

According to the invention, the formation of the thread drag is avoided by maintaining the time between the first contact of the pourable solution film with the textile reinforcing film and the first contact of the pourable solution film containing the textile reinforcing material with the regenerating bath very short, i.e., the time of direct contact is kept to between 0.1 to 15 seconds, preferably between 0.5 to 7 seconds. The time of direct contact within the time of 0.1 to 15 seconds depends on the material used for the textile reinforcement, on the solvent or solvent system used for the pourable solution, the temperature, as well as the concentration of the pourable solution on the dissolved membrane filter material, and on the temperature and composition of the regenerating bath. The process can be optimized by simple preliminary testing.

The shorter the time of direct contact, the less the likelihood the thread drag will occur that reduces the rate of flow (see Example 1). The occurrence of thread drag can be diagnosed by a reduced rate of flow or by electron microscopic examination.

The precipitation of membrane filter material from the pourable solution that contains textile reinforcing material is not spontaneous in the regenerating bath. Rather the strength of the solvent of the solvent system in the pourable solution film is reduced by the diffuse exchange of solvents in the pourable solution from the regenerating bath until it reaches the point of precipitation (stabilization). The speed that the point of stabilization (stabilization speed) is reached can be influenced by the content of solid matter of the solution, as well as the content of non-solvent material of the solvent system of the pourable solution. The precipitation time is generally reduced as the amount of solid matter, as well as non-solvent material in the pourable solution, is increased. The expansion and dissolving time for the textile reinforcing material is reduced to the extent that the precipitation time can be increased. This is reflected in an increase in the rate of flow in the textile reinforced membrane filter (See Example 2 a-c).

The imbedding of the textile reinforcement in the pourable solution film is preferably done by applying the pourable solution film to backing, such as on a drum or a continuous band of a common membrane filter manufacturing device. The textile reinforcing material is applied to the pourable solution film and another layer of pourable solution film is applied. This ensures that the textile reinforcement is completely imbedded in the pourable solution film.

It is also possible to apply the textile reinforcement to a pourable solution film on backing, whereby the backing is penetrated by the pourable solution and the pourable solution film becomes imbedded.

It is also possible to proceed in reverse manner, in that the pourable solution film is applied to textile reinforcing material that is placed on backing.

The textile reinforced membrane filters according to the invention generally have a thickness between 60 μm to 200 μm, depending on the type of textile reinforcing material used, and are suitable for a number of different applications, particularly as filter tubes and winding modules, as well as flat filters, particularly for use in housings or modules for static filtration and for cross current filtration.

The following examples further explain the invention:

EXAMPLE 1

73 kg of formic acid (technical, 98–100%) and 8 kg of de-ionized water are mixed for 5 minutes in a mixing device at room temperature. 19 kg of PA 6.6 granulates (DuPont, Zytel 42) are added and dissolved by rapid stirring. The temperature of the solution should be increased to 35° C. during the dissolving process of the PA 6.6 granulates and should then be kept at constant temperature for two hours. The clear pourable solution is then cooled to 10° C. at reduced stirring speed.

A film of pourable solution of 100 μm thickness is applied to a rotating drum that is immersed in a regenerating bath of 70% formic acid and water at a 1:1 ratio and cooled to 7° C. A strip of PA 6.6 material (NY 136 HC, Monofil, 47 μm thread size, Zuricher Beuteltuch Fabrik, CH) is placed and imbedded on the film of pourable solution, followed by a second layer of a film of pourable solution. The period of time between the imbedding and immersion of the wetted PA 6.6 material into the regenerating bath (time of direct contact) is varied by changing the speed of revolutions of the drum.

Table 1 shows the influence of the direct time of contact on the rate of flow of water at 20° C. on a polyamide reinforced polyamide membrane.

| Direct time of contact sec. | Rate of flow ml/cm bar min. |
|---|---|
| 14 | 5.3 |
| 10 | 6.5 |
| 7 | 8.6 |
| 5 | 10.7 |
| filter without reinforcement | 11.5 |

The results in Table 1 show that a reduction in the time of direct contact result in an improved rate of filtration in the nylon reinforced nylon membrane.

EXAMPLE 2 a) 73.5 kg of formic acid (technical, 98–100%) and 7.5 kg of de-ionized water are mixed and heated to 30° C. in a thermostatically controlled mixing device, followed by the addition of 19 kg of PA 6.6 granulate (DuPont, Zytel 42) and stirred for four hours at 30° C. The clear pourable solution is then stirred and cooled to 10° C.

A strip of PA 6.6 material, as described in Example 1, is applied in a continuous piece and imbedded on a film of pourable solution on a rotating drum and covered with a second layer of film. The time of direct contact between the time of imbedding and immersion into the regenerating bath is 4.2 seconds.

b) The same procedure as described in 2a) is followed to produce a pourable solution of 74 kg of formic acid, 10 kg of de-ionized water and 16 kg of PA 6.6 granulate at 30° C. The description in 2a) is followed for the manufacture of the PA 6.6 reinforced membrane filter c) A pourable solution of 71.8 kg formic acid, 11.2 kg de-ionized water and 17 kg PA 6.6 granulate at 40° C. is made following the description in 2a). The description in 2a) is followed for the imbedding of the PA 6.6 material into the cooled PA 6.6 pourable solution.

| Precipitation content of pourable solution % | PA 6.6 reinforced thickness μm | PA 6.6 reinforced bubble point bar | PA 6.6 membrane filter rate of flow ml/cm² bar min. |
|---|---|---|---|
| 7.5 | 190–200 | 4.8 | 5.1–4.8 |
| 10 | 170–180 | 5.1–5.3 | 6.2–5.8 |
| 11.2 | 135–180 | 4.3–4.5 | 10.8–8.7 |

The measurements in Examples 2a–c of textile reinforced filters show that an improved rate of filtration can be achieved by increasing the precipitants in the pourable solution at constant time of direct contact.

While presently preferred embodiments of the invention have been shown and described in particularity, the invention may be otherwise embodied within the scope of the appended claims.

What is claimed is:

1. A textile reinforced membrane filter comprising a membrane filter and a textile reinforcement both being made from aliphatic polyamides, whereby said textile reinforcement is imbedded in a film of a pourable solution of membrane filter material, and thereafter precipitating said membrane filter material in a regenerating bath.

2. A textile reinforced membrane filter comprising a membrane filter material and a textile reinforcement both being made from chemically identical synthetic polymers, whereby said textile reinforced membrane filter is made using a method comprising the following steps:
   a. imbedding said textile reinforcement in a film of a pourable solution of said membrane filter material; and
   b. precipitating said membrane filter material in a regenerating bath, wherein the time between the first contact of said film of solution with said textile reinforcement and the first contact of the film of pourable solution imbedded with the textile reinforcement material with the regenerating bath (time of direct contact) is maintained between 0.1 and 15 seconds.

3. A textile reinforced membrane filter according to claim 1 or 2 wherein said membrane filter and said reinforcement are made from polycondensation products of adipic acid and hexamethylene-diamine (PA 6.6), or of poly-Σ-caprolactam (PA 6).

4. A textile reinforced membrane filter according to claim 1 or 2, wherein the textile reinforcement is of woven or knit fabric or of perforated foil (ductile foil).

5. A textile reinforced membrane filter according to claim 1 or 2, wherein the textile reinforcement material is a woven or knit fabric having a thread diameter of between 25 and 80 μm.

6. A textile reinforced membrane filter according to claim 1 or 2, wherein said textile reinforcing material is partly or entirely imbedded in said membrane filter material.

7. A method for the manufacture of textile reinforced membrane filters according to claim 1, wherein the time between a process step of first contacting said film of solution with said textile reinforcement and a following process step of precipitating said membrane filter is between 0.1 and 15 seconds.

8. A method as set forth in claim 7 wherein said contact time is maintained within 0.5 and 7.0 seconds.

9. A method, according to claim 7, wherein said textile reinforcement is imbedded in said film of pourable solution on a backing, and that a second film of pourable solution is applied.

10. A method according to claim 7 or 8, wherein said textile reinforcement is applied to a film of pourable solution on a backing.

11. A method according to claim 7 or 8, wherein said film of pourable solution is applied to the textile reinforcement on a backing.

12. A method according to claim 7 or 8, wherein said respective membrane material and said textile reinforcing materials are of synthetic polymers of the same substance class.

13. A method according to claim 7 or 8, wherein said respective membrane material and said textile reinforcing material are chemically identical synthetic polymers.

14. A method according to claim 7 or 8, wherein said respective membrane material and said textile reinforcing material are aliphatic polyamides.

15. A method according to claim 7 or 8 wherein said respective membrane material and said textile reinforcing material are polycondensation products of adipic acid and hexamethylene-diamine (PA 6.6), or of poly-Σ-caprolactam (PA 6).

16. A method according to claim 7 or 8, wherein said embedment of said textile reinforcing material in said pourable solution is performed continuously as a step in a continually working membrane manufacturing process.

17. A method of using a textile reinforced membrane filter according to claim 1 in at least one application selected from the group of tube filters, winding modules, flat filters, housings and modules, said method being effective for static filtration and cross current filtration.

* * * * *